(12) United States Patent
Wentworth et al.

(10) Patent No.: US 6,575,654 B2
(45) Date of Patent: Jun. 10, 2003

(54) FLEXIBLE SNAP-TOGETHER CABLE ENCLOSURE

(75) Inventors: Michael John Wentworth, Belle Plaine, MN (US); Alex Watts, Minnetonka, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/910,420

(22) Filed: Jul. 20, 2001

(65) Prior Publication Data

US 2003/0016989 A1 Jan. 23, 2003

(51) Int. Cl.$^7$ .................................. F16L 11/00
(52) U.S. Cl. ................... 403/56; 285/261; 285/146.1; 138/120
(58) Field of Search ................ 138/118, 120, 138/128, 121, 157, 162, 155, DIG. 8; 403/56, 113, 114, 19, 344; 482/35; 446/86, 69, 124, 121, 120; 220/284, 281, 682, 691; 411/433, 539; 285/51, 146.1–146.3, 261, 907

(56) References Cited

U.S. PATENT DOCUMENTS

| | | | | |
|---|---|---|---|---|
| 1,255,577 A | * | 2/1918 | Berry ........................ 285/107 |
| 1,695,263 A | * | 12/1928 | Jacques ..................... 138/120 |
| 4,570,437 A | | 2/1986 | Moritz ....................... 59/78.1 |
| 4,648,733 A | * | 3/1987 | Merkt ......................... 403/56 |
| 4,658,577 A | | 4/1987 | Klein ......................... 59/78.1 |
| 4,739,801 A | * | 4/1988 | Kimura et al. .............. 138/120 |
| 5,033,528 A | * | 7/1991 | Volcani ..................... 160/351 |
| 5,067,678 A | | 11/1991 | Henneberger et al. ..... 248/68.1 |
| 5,143,123 A | * | 9/1992 | Richards et al. ........... 138/120 |
| 5,160,811 A | | 11/1992 | Ritzmann ..................... 431/5 |
| 5,161,580 A | | 11/1992 | Klug ......................... 174/68.3 |
| 5,240,209 A | | 8/1993 | Kutsch ........................ 138/92 |
| 5,271,585 A | | 12/1993 | Zetena, Jr. .................. 248/49 |
| 5,276,596 A | | 1/1994 | Krenzel ....................... 248/49 |
| 5,316,243 A | | 5/1994 | Henneberger ............... 362/191 |
| 5,316,244 A | | 5/1994 | Zetena, Jr. ................. 248/68.1 |
| 5,335,349 A | | 8/1994 | Kutsch et al. ............... 248/49 |
| 5,449,206 A | * | 9/1995 | Lockwood ................... 285/261 |
| 5,503,354 A | | 4/1996 | Lohf et al. ................. 375/257 |
| 5,752,781 A | | 5/1998 | Haataja et al. ............... 248/58 |
| 5,839,476 A | * | 11/1998 | Blase ......................... 138/120 |
| 5,923,753 A | | 7/1999 | Haataja et al. ............. 403/387 |
| 5,937,131 A | | 8/1999 | Haataja et al. ............. 379/438 |
| 5,995,699 A | | 11/1999 | Vargas et al. ............... 385/136 |
| 6,029,293 A | * | 2/2000 | Paterson et al. ............... 4/623 |
| 6,037,538 A | | 3/2000 | Brooks ..................... 222/185.1 |
| 6,073,626 A | * | 6/2000 | Riffe ....................... 128/201.11 |
| 6,076,779 A | | 6/2000 | Johnson ....................... 248/49 |
| 6,156,974 A | | 12/2000 | Blasé |
| 6,170,249 B1 | | 1/2001 | Blasé et al. |
| 6,408,888 B1 | * | 6/2002 | Baumer et al. ............. 138/120 |

FOREIGN PATENT DOCUMENTS

GB          612162        11/1948

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2×2," 2 pages, dated May, 1999.
ADC Telecommunications brochure entitled "FiberGuide® Fiber Management Systems," 37 pages, dated Jun. 1998.
ADC Telecommunications brochure entitled "FiberGuide® Fiber Management Systems," 54 pages, dated Sep. 2000.

* cited by examiner

*Primary Examiner*—J. J. Swann
*Assistant Examiner*—Ruth C. Rodriguez
(74) *Attorney, Agent, or Firm*—Merchant & Gould P.C.

(57) ABSTRACT

A flexible cable guide member and assembly, the assembly including first and second cable guide members each having a curved wall with open ends. The curved walls define first and second cable pathways respectively for receiving a telecommunications cable. A first end of the first guide member defines a socket. A second end of the second guide member is rounded to be received by the socket of the first guide member to produce a ball-and-socket joint between the first and second guide members. The second guide member is snap-fit into the socket of the first cable guide member. The guide members define longitudinal slots to allow cables to be added or removed from the assembly. The first and second guide members are preferably identical.

4 Claims, 7 Drawing Sheets

FLEXIBLE SNAP-TOGETHER CABLE ENCLOSURE

FIELD OF THE INVENTION

This invention pertains to a system for the management and routing of cables, such as telecommunications cables. More particularly, this invention pertains to flexible enclosure assemblies for cable management systems.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough or enclosure members, fittings and couplings for routing the cables. U.S. Pat. Nos. 5,067,678; 5,316,243; and 5,752,781 show various cable routing systems.

When routing cables, it is desirable that the routing system will be easy to install. For example, providing a continuous cable path throughout the system can be a challenge, such as when obstacles or misalignments arise during installation of the system. There is a need for devices which make system installation easier and less reliant on precisely aligned components. There is a need for an improved, simplified, cost effective system for making adjustments in the alignment of a cable management system.

SUMMARY OF THE INVENTION

The present invention relates to a flexible cable guide member and assembly. The assembly includes first and second cable guide members having a curved wall with open ends. The curved walls define first and second cable pathways respectively for receiving a telecommunications cable. A first end of the first guide member defines a socket. A second end of the second guide member is rounded to be received by the socket of the first guide member to produce a ball-and-socket joint between the first and second guide members. The second guide member is snap-fit into the socket of the first cable guide member. The guide members define longitudinal slots to allow cables to be added or removed from the assembly. The first and second guide members are preferably identical.

Another aspect of the present invention relates to the method of retaining cables inside a cable guide assembly. The method includes the step of twisting or rotating one cable guide member relative to another so that longitudinal slots through each guide member no longer overlap, thereby enclosing the cables.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

Figure 1:
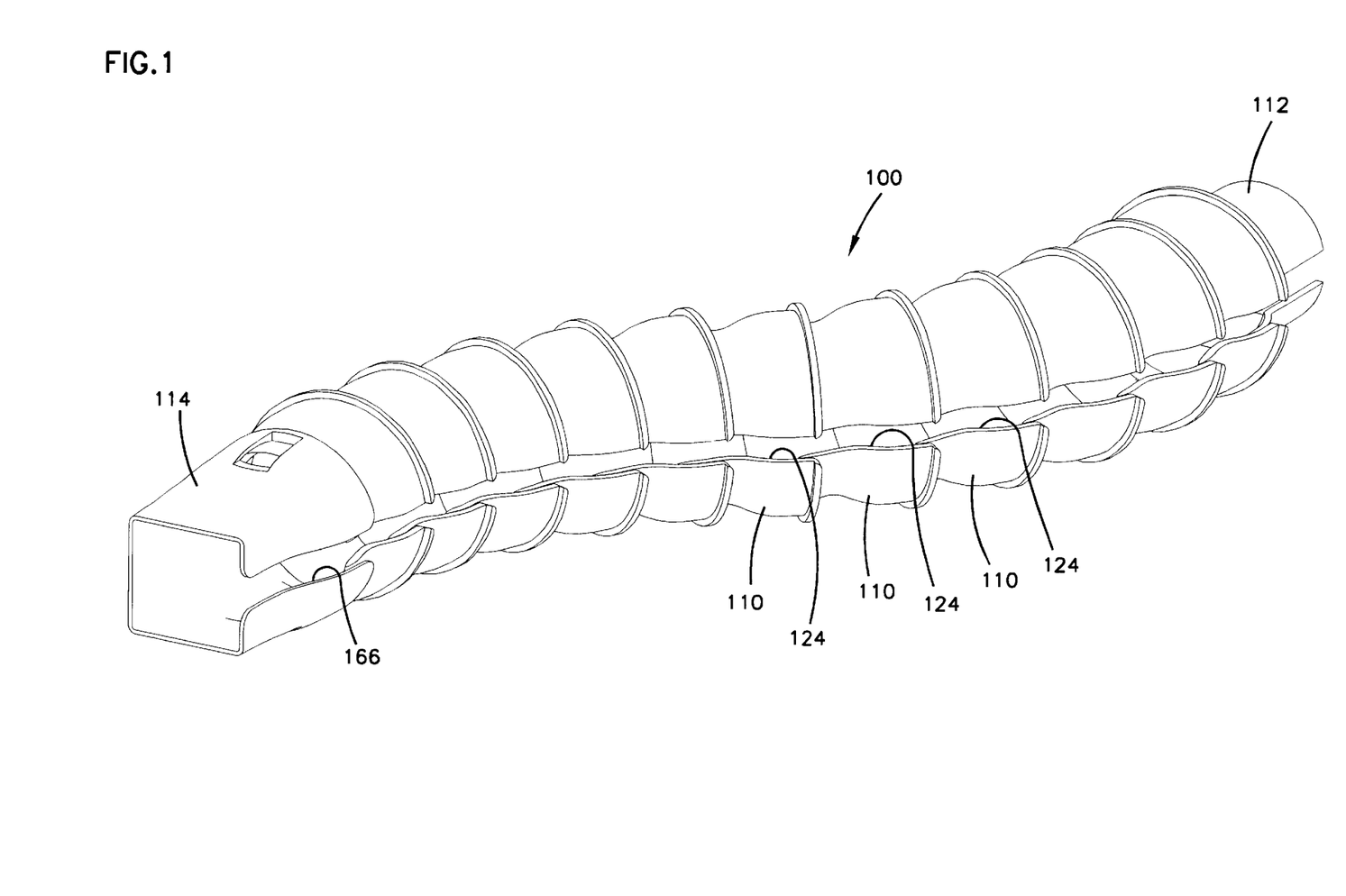
FIG. 1 is a perspective view of a flexible cable guide assembly according to the present invention.
Figure 2:
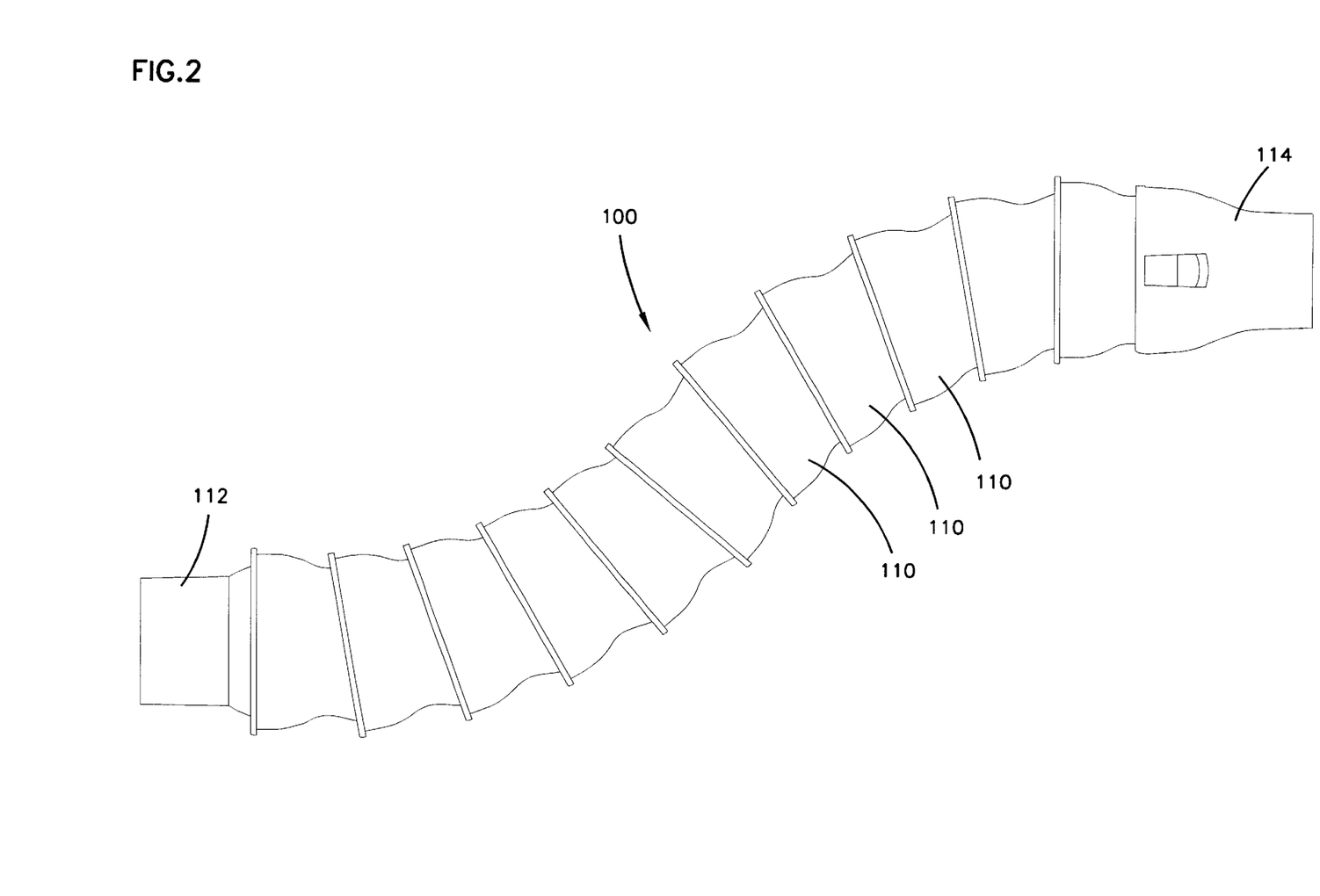
FIG. 2 is a top view of the assembly of FIG. 1.
Figure 3:
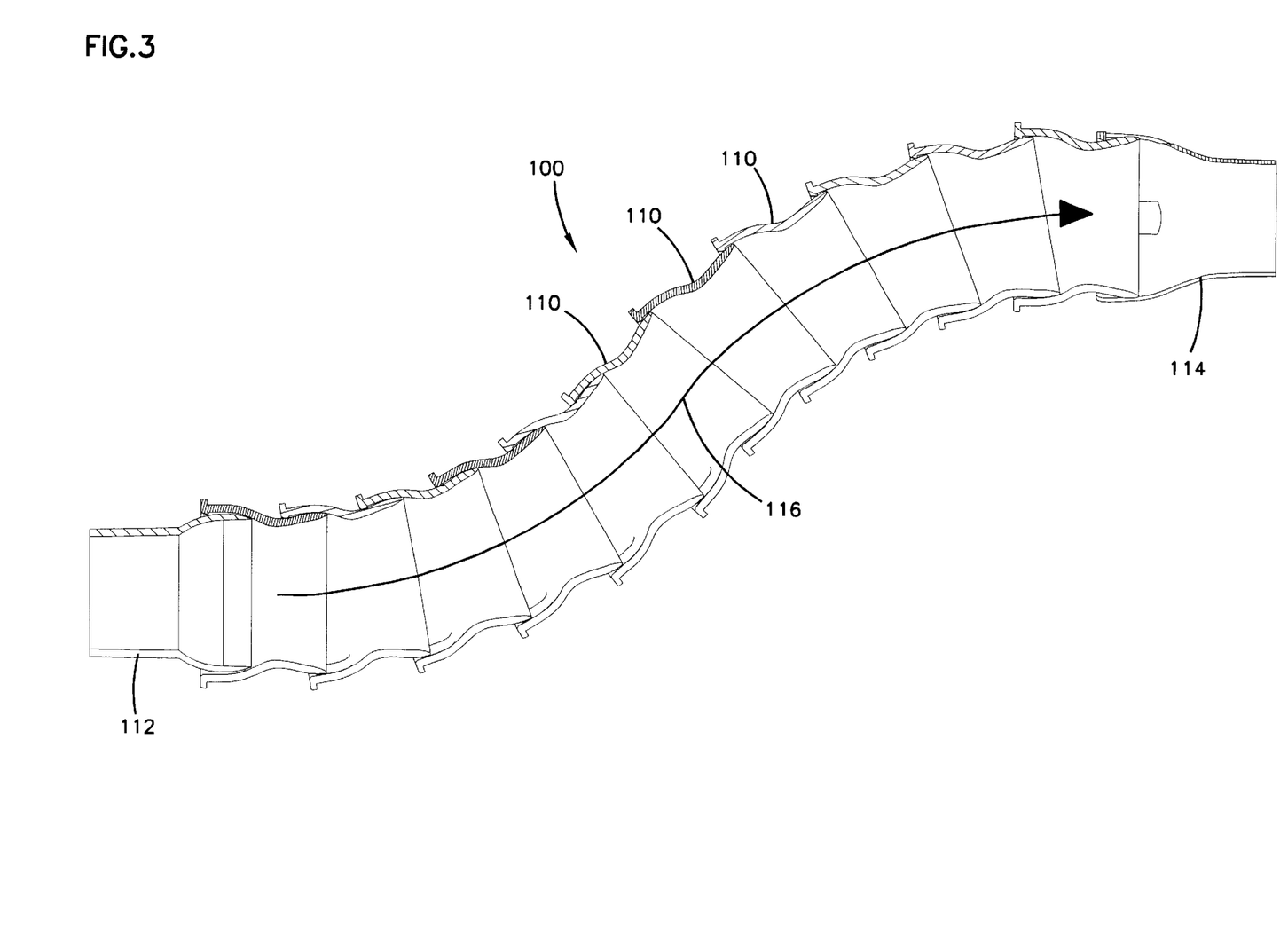
FIG. 3 is a cross-section view of the assembly of FIG. 1.
Figure 4:
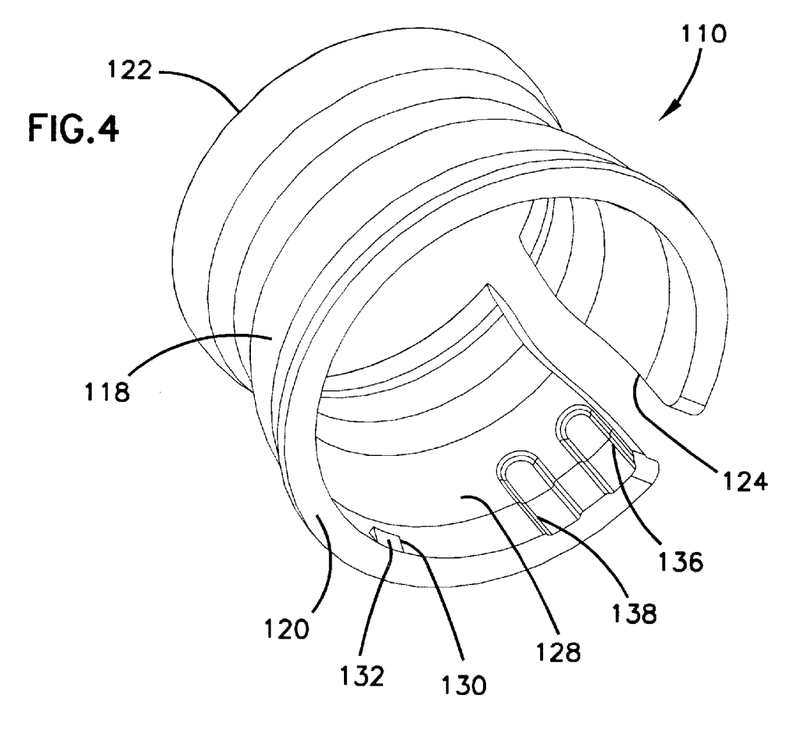
FIG. 4 is a perspective view of a cable guide member according to the present invention.
Figure 5:
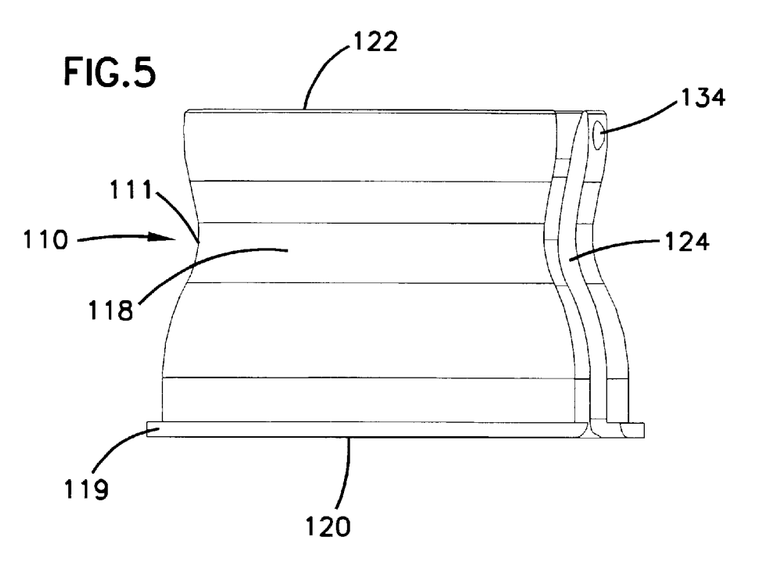
FIG. 5 is a side view of the cable guide member of FIG. 4.
Figure 6:
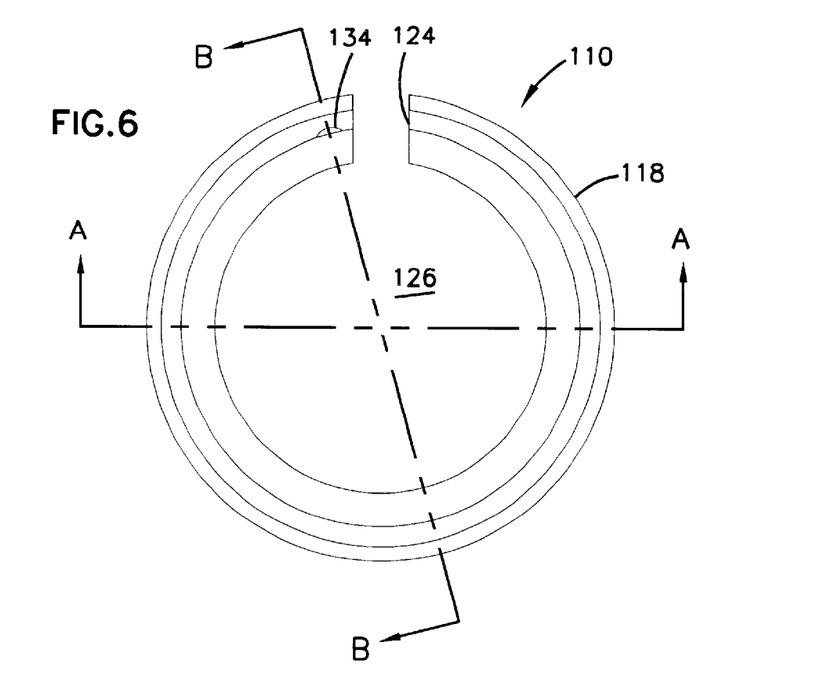
FIG. 6 is a top end view of the cable guide member of FIG. 5.
Figure 7:
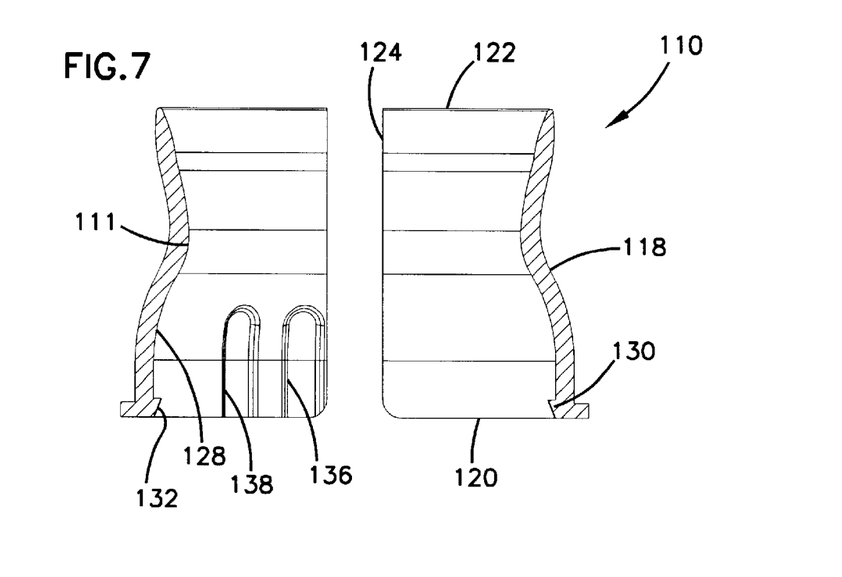
FIG. 7 is a cross-section view of the cable guide member of FIG. 6 along line A—A.
Figure 8:
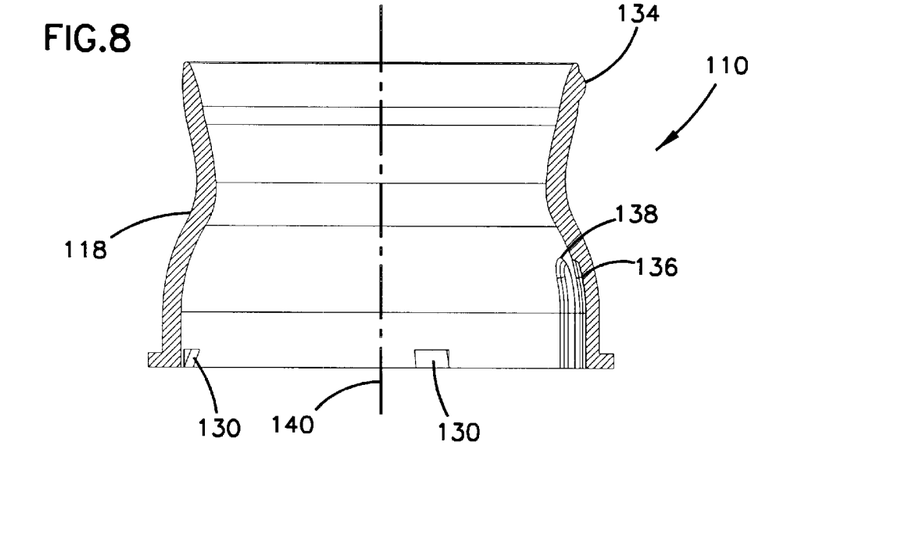
FIG. 8 is a cross-section view of the cable guide member of FIG. 5 along line B—B.

Referring now to FIGS. 1–3, a flexible cable management assembly 100 according to the present invention is shown. The assembly 100 includes a plurality of cable guide members 110 consecutively linked between two cable guide adapters 112 and 114. Each guide member 110 receives an adjacent guide member and, in turn, is received by an adjacent guide member 110. Together the linked guide members 110 define a combined cable pathway 116 along a central, longitudinal axis.

Referring now to FIGS. 4–8, each guide member 110 includes a curved wall 118 having open opposite ends 120 and 122. The curved wall 118 defines a longitudinal cable pathway 126 for receiving at least one telecommunications cable. The curved wall 118 also defines a longitudinal slot 124 or opening between the two ends 120 and 122. The slot 124 allows cables to be placed inside or removed from the cable guide member 110. A flange 119 extends outwardly from end 120.

Guide members 110 are generally shaped as an hourglass having a narrow middle portion 111 between to wider ends 120 and 122. End 120 defines a socket 128 for receiving adjacent guide members 110. The curved wall adjacent end 122 is rounded in the shape of a spherical zone corresponding to the size of socket 128 so that end 122 can be received by the socket 110 of an adjacent identical guide member 110. When end 122 of a first guide member 110 is received into the socket 128 of a second guide member 110, a ball-and-socket joint is formed. The ball-and-socket joint allows the second guide member to be angled relative to the first guide member in two perpendicular directions. It is to be understood that end 122 and socket 128 may include gaps and openings such as longitudinal slot 124 and still fall within the scope of the invention.

To retain end 122 within socket 128, retention tabs 130 having ramped surfaces 132 extend from an inside surface of the curved wall 118 near end 120. The ramped surfaces 132 allow two guide members 110 to be snap-fit together.

Figure 9:
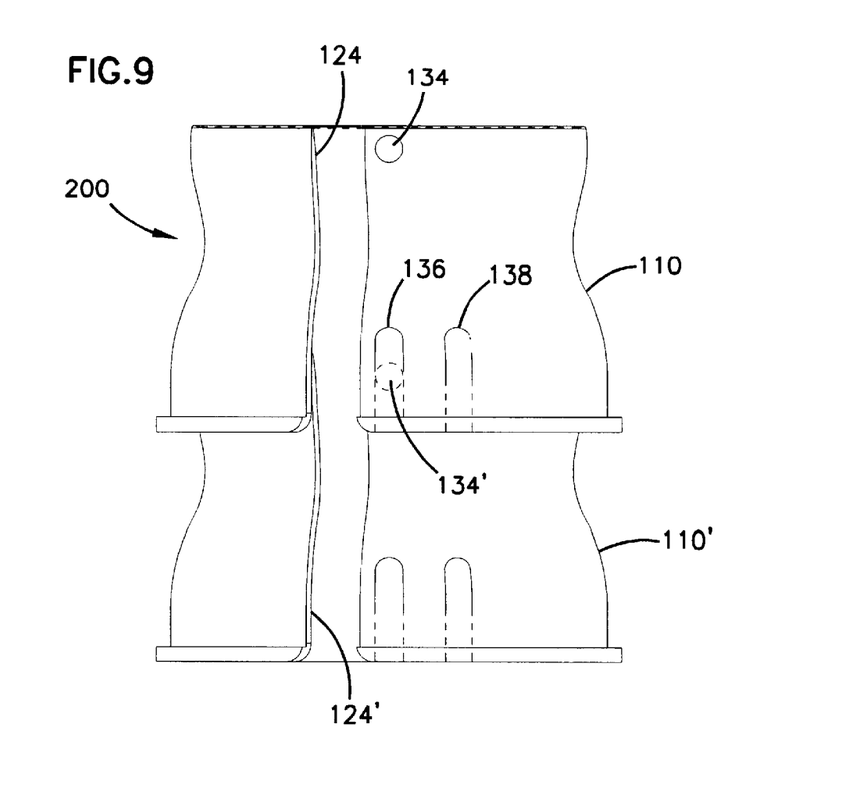
FIG. 9 is a side view of two cable guide members linked according to the present invention. Positioning grooves are shown indicated by broken lines.
Figure 10:
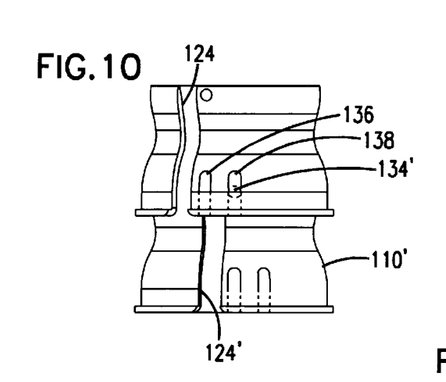
FIG. 10 is a side view of the two cable guide members of FIG. 9 in a rotated position whereby the cable pathways are enclosed.
Figure 11:
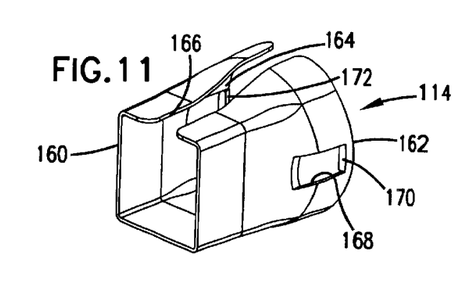
FIG. 11 is a perspective view of a first cable guide adapter according to the present invention for coupling a guide member assembly of the present invention to a rectangular guide system.
Figure 12:
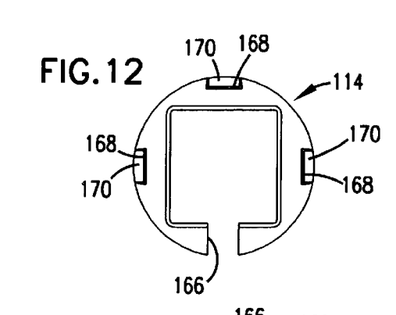
FIG. 12 is an end view of the adapter of FIG. 11.
Figure 13:
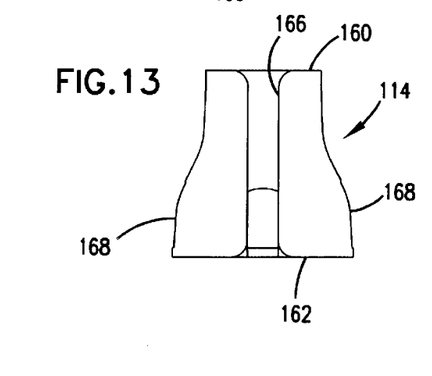
FIG. 13 is a first side view of the adapter of FIG. 11.
Figure 14:
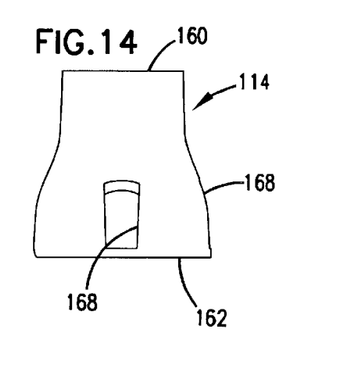
FIG. 14 is a second side view of the adapter of FIG. 11.
Figure 15:
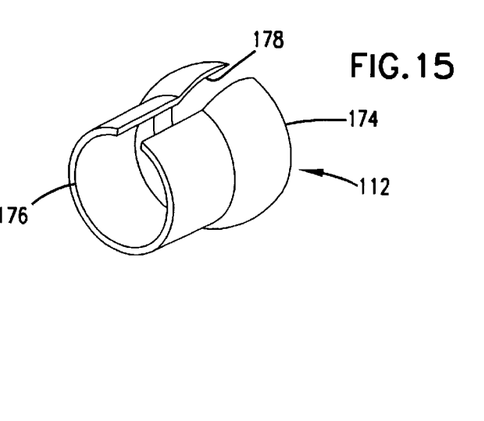
FIG. 15 is a perspective view of a second cable guide adapter according to the present invention for coupling a guide member assembly of the present invention to a round or cylindrical cable guide system.
Figures 16, 17:
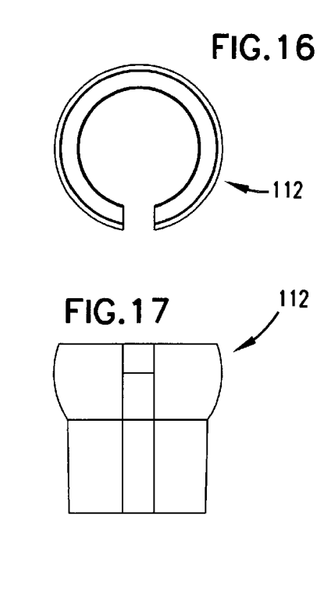
FIG. 16 is an end view of the adapter of FIG. 15.
FIG. 17 is a first side view of the adapter of FIG. 15.
Figure 18:
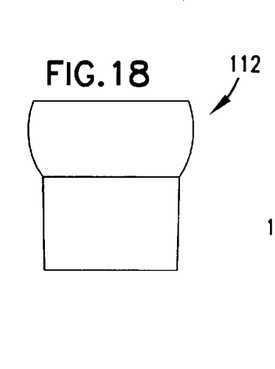
FIG. 18 is a second side view of the adapter of FIG. 15.

An outside surface of curved wall 118 includes a detent bump 134 near end 122. Socket 128 includes first and second detent grooves 136 and 138. Detent bump 134 may be received in either detent groove 136 or 138 when end 122 is received in socket 128. FIG. 9 shows an assembly 200 of two identical guide members 110' and 110. Grooves 136 and 138, which are actually on the inside of guide member 110 are indicated by broken lines. The detent bump and groove arrangement maintains the axial rotational position of guide member 110' inside guide member 110. That is, guide member 110' can be rotated around its longitudinal axis 140 (see FIG. 8) relative to guide member 110. Detent bump and groove arrangement establishes two stable positions in this dimension. When bump 134 is received in first groove 136, slot 124' is aligned with slot 124 (as shown in FIG. 9) allowing cables to be added or removed from the assembly 200. As shown in FIG. 10, guide member 110' may be rotated about its longitudinal axis 140 relative to guide member 110 so that detent bump 134' is received by groove 138. In this position, slots 124 and 124' are not aligned thereby enclosing the cable pathway and preventing cables from escaping the assembly. In the assembly 100 shown in FIGS. 1–3, the guide members 110 are all rotationally positioned so that the longitudinal slots 124 of each guide member are aligned.

As shown in FIGS. 1–3, many trough members 110 can be combined to produce a cable management assembly defining a curvilinear cable pathway. The ability to enclose the cable pathway by rotating the guide members 110 relative to one another, makes the assembly well suited for both vertical and horizontal applications. That is, the present invention is a efficient means of managing and guiding cables down from cable management systems suspended near the ceiling to lower telecommunications equipment. The present invention is also useful in correcting for misaligned cable management systems. Furthermore, the guide members 110 are versatile in that the same guide member 110 may be used to angle the cable pathway in a variety of directions. This ability eliminates the need to manufacture and stock several different parts for each direction. The cable guide members 110 are also versatile in that they can angle the cable pathway simultaneously in two perpendicular directions.

The guide members 110 in accordance with the present invention can be assembled on-site to the desired length. This helps the installer by avoiding precise measurement of dimensions. The installer can order or stock a number of trough members 100 separately or in kits and then assemble them together to define the desired length of trough. Further, because of the flexibility of the trough to define a variety of angles and shapes, the installer can conveniently link cable pathways without having to premeasure the offset or misalignment.

Another advantage of the present system is its ability to prevent damage to cables and signal transmission resulting from excessive bending. Excessive bending of a cable beyond a recommended minimum bend radius can result in degradation of the information signal being transmitted. Because each guide member 110 of the present invention when mated to another guide member 110 can only angle the cable pathway a limited amount, the minimum bend radius of the cables can be maintained.

FIGS. 11–14 show the first cable guide adapter 114. The adapter 114 has a rectangular end 160 and a curved end 162. Curved end 162 defines a socket 164 similar to socket 128 in guide member 110. Socket 162 is sized to receive end 122 of guide members 110. Adapter 114 also defines a longitudinal slot 166 along its length to allow cables to be added or removed from the adapter 114. Rectangular end 160 may be coupled to existing rectangular cable guides, such as cable guide downspouts, using any of various couplings known in the art. Adapter 114 includes three openings 168 spaced around adapter 114. A ledge 170 having a ramped surface 172 defines one side of each opening 168. Ledges 170 protrude into the interior of the adapter 114 and act in the same way as retention tabs 130 in guide members 110 to retain end 122 of a mated guide member 110 in socket 164.

FIGS. 15–18 show the second cable guide adapter 112. Adapter 112 has a rounded end 174 and a cylindrical end 176. Like end 122 of guide member 110, rounded end 174 of adapter 112 is shaped as a spherical zone to be received by a socket such as socket 128 on guide member 110. Adapter 112 also defines a longitudinal slot 178 along its length to allow cables to be added or removed from the adapter 112. Cylindrical end 176 may be coupled to existing cylindrical cable guides, such as cable guide tubing, using any of various couplings known in the art.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

What is claimed is:

1. A flexible cable guide assembly comprising:
   a first cable guide member having a wall with first and second open opposite ends, the wall defining a first cable pathway along a longitudinal axis for receiving at least one telecommunications cable, the wall of the first guide member defining a longitudinal slot from its first end to its second end, the first end defining a socket;
   a second cable guide member having a wall with first and second open opposite ends, the wall defining a second cable pathway along a longitudinal axis for receiving at least one telecommunications cable, the wall of the second guide member defining a longitudinal slot from its first end to its second end, the second end of the second guide member shaped as a spherical zone and received in the socket of the first cable guide member so that the first cable pathway communicates with the second cable pathway;

wherein the second pathway may be angled in two perpendicular directions relative to the first cable pathway; and wherein an inside surface of the first end of the first guide member includes first and second detent grooves, and further wherein an outside surface of the second end of the second guide member includes a detent bump, the detent bump received in one of the first and second detent grooves, wherein when the detent bump is received in the first detent groove the longitudinal slot of the first guide member is aligned with the longitudinal slot of the second guide member, and wherein when the detent bump is received in the second detent groove the longitudinal slot of the first guide member is not aligned with the longitudinal slot of the second guide member.

2. The cable guide assembly of claim 1 wherein the first guide member is identical to the second guide member.

3. The cable guide assembly of claim 1 wherein an inside surface of the first end of the first guide member includes at least one retention tab having a ramped surface.

4. A method of using a cable guide assembly comprising the steps of:

providing first and second cable guide members each having at least one wall defining a cable pathway, an end of the first cable guide member being received in an end of the second cable guide member so that the cable pathways of the guide members communicate forming a combined cable pathway, the wall of the first cable guide member defining an opening along its length, the wall of the second cable guide member defining an opening along its length, an exterior surface of the end of the first cable guide member defining a detent bump, and the interior surface of the end of the second cable guide member defining first and second detent grooves, the detent bump being received in the first detent groove so that the openings of the first and second cable guide members are aligned;

placing a cable into the combined cable pathway by means of the aligned openings;

rotating the first cable guide member relative to the second cable guide member about a central axis so that the detent bump is moved from the first detent groove to the second detent groove so that the opening of the first cable guide member is not aligned with the opening of the second cable guide member, thereby enclosing the cable in the combined cable pathway.

* * * * *